March 22, 1966 F. M. RONCI Re. 25,984

HEEL AND TAP THEREFOR

Original Filed Feb. 20, 1957

INVENTOR.
FERNANDO M. RONCI
BY
Max Schwartz
ATTORNEY

United States Patent Office

Re. 25,984
Reissued Mar. 22, 1966

25,984
HEEL AND TAP THEREFOR

Fernando M. Ronci, Providence, R.I.
(2 Atlantic Blvd., Centredale, R.I.)

Original No. 2,851,797, dated Sept. 16, 1958, Ser. No. 641,403, Feb. 20, 1957. Application for reissue Sept. 30, 1958, Ser. No. 764,466
3 Claims. (Cl. 36—42)

Matter enclosed in heavy brackets [ ] appears in the original patent but forms no part of this reissue specification; matter printed in italics indicates the additions made by reissue.

My present invention relates to the shoemaking art and more particularly to a novel construction of a heel and tap.

The principal object of the present invention is to provide a heel having a tap that is simple and easy to attach or replace.

Another object of the present invention is to provide a heel and tap which produces a strengthening of the heel construction and provides a firmer support.

Another object of the present invention is to provide a heel and tap which lends itself to ornamentation.

A further object of the invention is to provide a heel and tap which is particularly adaptable for very narrow women's heels.

Another object of the present invention is to provide a heel and tap construction which is economical to manufacture and assemble.

With the above and other objects and advantageous features in view, my invention consists of a novel arrangement of parts more fully disclosed in the detailed description following, in conjunction with the accompanying drawings and more particularly defined in the appended claims.

In certain types of women's shoes the heel has been constructed with an extremely narrow shank popularly called a "spike." These heels have become so small in cross section that they are extremely weak and easily broken. Recently they have been molded of plastic material to give them additional strength. But regardless of their construction it has become increasingly difficult to supply these heels with at tap at the bottom. The nailing area is extremely small and it is difficult to fit the tiny tap to the bottom of the heel. Furthermore, it has become fashionable to use metal taps, and again the small area has prevented a firm attachment. When the taps are worn the shoemaker finds it extremely difficult to renail a new tap without splitting the heel.

Figure 1:
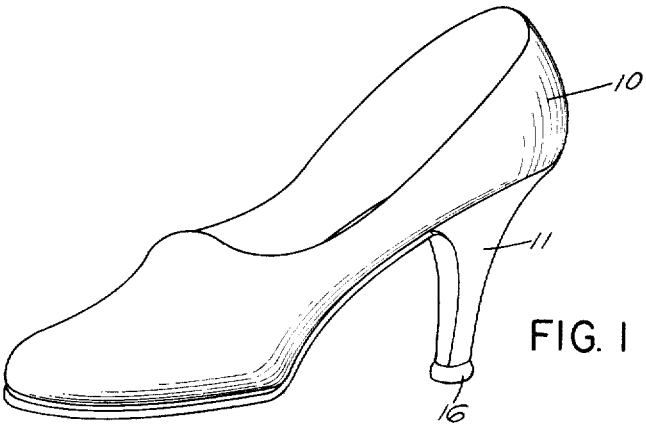
FIG. 1 is a perspective view of a woman's shoe having the heel and tap of the present invention.
Figure 2:
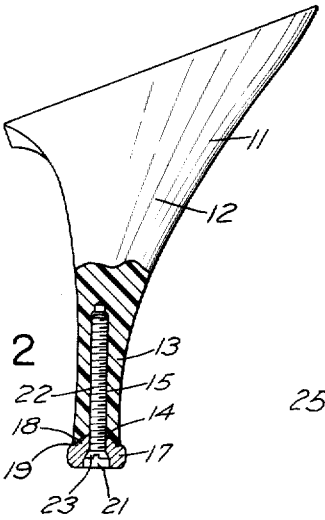
FIG. 2 is a side elevation, partly in section, of the heel and tap.

The present invention is designed to overcome these difficulties by providing a heel and tap construction which is self-centering and easy to attach or replace and which actually strengthens the narrow lower end of the heel. Referring to the drawings, the shoe 10 is provided with a heel 11 which can be made out of any suitable material such as wood or plastic or leather. As shown in FIG. 2 for purposes of illustration, the heel is shown made out of plastic material. The top portion

12 of the heel 11 is broad and strong. However, this tapers downwardly to an extremely narrow portion 13 which is often less than ½ inch in diameter. In accordance with the present invention the bottom end of the portion 13 is dished at 14 and provided with a vertical threaded opening 15 extending upwardly through the portion 13, a distance of approximately 1 inch or 1½ inches.

Figure 3:
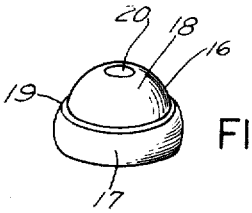
FIG. 3 is a perspective view of the tap.

Now referring to FIG. 3, I provide a tap 16 which may also be made of any suitable material such as rubber, leather, or metal. It has become fashionable to make these taps out of brass which enhances the shoe with its gold color. In the form shown in FIG. 3, the tap is round and is provided with a thick portion 17 which may have arcuate sides and is of slightly larger diameter than the heel portion 13. Integrally formed with the portion 17 is a domed portion 18 which is shaped to exactly fit the dished portion 14 of the heel. This leaves a shoulder or ledge 19 extending around the bottom of the portion 18. The tap 16 is provided with a central opening 20 of the same diameter as the opening 15 in the heel portion 13. As shown in FIG. 2, the bottom of the tap 16 is provided with a wider opening 21 communicating with the opening 20.

In assembly the tap 16 is placed at the bottom of the heel portion 13 and it will be found that the domed portion 18 will slide into the dished portion 14 to center the tap in correct position with the edge of the dished portion 14 resting on the shoulder 19. An elongated screw 22 is now passed through the tap 16 and threaded into the opening 15. The head 23 will countersink the opening 21. The screw 22 not only serves to lock the tap to the heel but forms a stiff solid metal core for the narrow portion 13 of the heel and strengthens this area so that it will not snap or break. The screw head 23 will not become worn because it is countersunk. In replacing the tap it is a simple matter to position the screw and put a new tap into place. The combination of the dished portion 14 and the domed portion 18 serves as a self-centering socket and also increases the area of support for the bottom of the heel.

Figure 6:
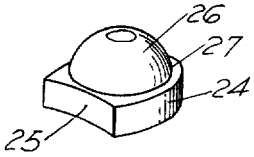
FIG. 6 is a perspective view of another shape of tap.

While the tap shown in FIG. 3 may be used with round heels or heels that are flat at the instep, the tap can be shaped as shown in FIG. 6. Here the bottom body portion 24 is shaped like the heel with the flat side 25 and with straight sides. It is also slightly larger than the heel so that the domed portion 26 leaves the shoulder 27 for the bottom edge of the heel.

Figure 4:
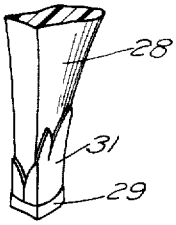
FIG. 4 is a perspective view of the lower portion of the heel with an ornament and tap attached thereto.
Figure 5:
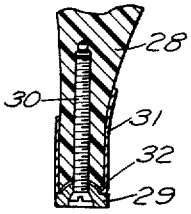
FIG. 5 is a longitudinal section of the construction shown in FIG. 4.

The above construction also lends itself to additional ornamentation easily applied. Referring to FIGS. 4 and 5, the heel 28 is provided with the tap 29 and screw 30. The ornamental portion 31 comprises a flat stamping shaped to fit the outside of the heel and being provided at its bottom edge with a flange 32 which is positioned beneath the bottom edge of the heel and which may extend into the dished portion as shown in FIG. 5. After the ornament is first positioned on the heel, the tap 29 is put in place and the screw 30 locks the parts together. It is thus evident that the ornament will be pinched between the tap and the heel. Thus the same screw that holds the tap will also hold the ornament.

Figure 7:
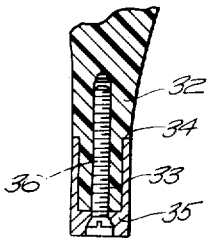
FIG. 7 is a section similar to FIG. 5 showing another form of my invention.

If desired the ornament and the tap may be combined in a single integral construction as shown in FIG. 7. In this form the narrow heel portion 32 is provided with a narrow end 33 forming a shoulder 34. The tap 35 comprises a thickened bottom and a tubular shell having the same internal diameter as the heel portion 33. The shell is slipped over the end of the heel until it abuts the shoulder 34. The screw 36 operates in the same manner as in the previous forms. In this form the integral metal shell serves as additional strengthening means for the heel besides providing a contrasting metallic color at the lower end of the heel. It is therefore obvious that it can be made shorter so that it forms a small socket for the end of the heel, or it can be elongated to cover the entire narrow portion of the heel even beyond the inner end of the screw 36.

Where the tap is made in annular form, such as shown in FIG. 3, an additional advantage is obtained. As the rear edge of the heel wears down, the screw can be loosened and the heel turned to bring an unworn portion to the point of greatest wear. This will prolong the life of the metal heel.

The construction of the present invention lends itself to the use of various materials, shapes and ornamentations. The combination of the tap and heel forms a self-centering firm support. By extending the assembly screw through the thin portion of the heel a strong metal core is provided which greatly strengthens this area. Other advantages of the present invention will be readily apparent to a person skilled in the art.

I claim:

1. A heel for a woman's shoe comprising a broad top portion tapering to an elongated very narrow bottom portion to form a narrow high heel having a very narrow bottom portion extending approximately one third the height of the heel, said narrow portion being of an integral solid construction and having a central vertical threaded opening extending upwardly through said very narrow portion, a tap fitting the bottom end of said heel, said heel having a dished bottom and said tap having a domed top fitting into said dished bottom, said tap having an annular portion wider than said heel to provide a shoulder around the base of said domed top, and a metal screw extending through said tap and into said threaded opening to lock said tap to said heel, said screw being elongated to extend through the length of said narrow portion opening to form a reinforcing core for the narrow portion of said heel.

2. A heel for a woman's shoe comprising a broad top portion tapering to an elongated very narrow bottom portion to form a narrow high heel having a very narrow bottom portion extending approximately one third the height of the heel, said narrow portion being of an integral solid construction and having a central vertical threaded opening extending upwardly through said very narrow portion, a tap fitting the bottom end of said heel, said heel having a dished bottom and said tap having a domed top fitting into said dished bottom, said tap having an annular portion wider than said heel to provide a shoulder around the base of said dome top, an ornamental shell surrounding the bottom end of said heel and having an integral portion extending between the bottom of said heel and said tap, said extending portion being domed to conform to the shape of said heel and tap, and a metal screw extending through said tap and into said threaded opening to lock said tap to said heel, said screw being elongated to extend through the length of said narrow portion opening to form a reinforcing core for the narrow portion of said heel.

*3. A heel for a woman's shoe comprising an integral one-piece plastic heel having a broad top portion tapering to an elongated very narrow bottom portion to form a narrow high heel having a very narrow bottom portion extending approximately one third the height of the heel, said narrow portion being of an integral solid construction and having a central vertical opening extending upwardly through said very narrow portion, a metal tap fitting the bottom end of said heel having a central opening, and a metal fastening element extending through said tap opening and into said narrow portion opening to lock said tap to said heel, said fastening element being elongated to extend through the length of said narrow portion opening to form a reinforcing core for the narrow portion of said heel.*

References Cited by the Examiner

The following references, cited by the Examiner, are of record in the patented file of this patent or the original patent.

UNITED STATES PATENTS

| | | | |
|---|---|---|---|
| 1,598,397 | 8/1926 | Senise | 36—42 X |
| 1,754,280 | 4/1930 | McNamara | 36—36 |
| 2,076,978 | 4/1937 | Butler | 36—36 |
| 2,522,830 | 9/1950 | Leganger-Krogstad | 36—34 |
| 2,544,878 | 3/1951 | Dratler | 36—34 X |

FOREIGN PATENTS

| | | |
|---|---|---|
| 329,884 | 9/1935 | Italy. |

FRANK J. COHEN, *Primary Examiner.*

EDWARD V. BENHAM, DAVID J. WILLIAMOWSKY, *Examiners.*